US 6,747,838 B2

(12) United States Patent
Korbel et al.

(10) Patent No.: US 6,747,838 B2
(45) Date of Patent: Jun. 8, 2004

(54) THERMAL PERFORMANCE OF AN INTEGRATED AMPLIFIER IN A DISC DRIVE

(75) Inventors: Garry E. Korbel, New Prague, MN (US); Ranjeet K. Pancholy, Saratoga, CA (US); Hakam D. Hussein, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 264 days.

(21) Appl. No.: 09/893,130

(22) Filed: Jun. 27, 2001

(65) Prior Publication Data

US 2002/0109935 A1 Aug. 15, 2002

Related U.S. Application Data

(60) Provisional application No. 60/271,302, filed on Feb. 23, 2001, and provisional application No. 60/269,144, filed on Feb. 15, 2001.

(51) Int. Cl.[7] ............................................. G11B 5/596
(52) U.S. Cl. ...................... 360/78.06; 360/75; 360/61
(58) Field of Search ................ 360/78.06, 75, 360/61

(56) References Cited

U.S. PATENT DOCUMENTS

| 3,723,980 A | 3/1973 | Gabor ..................... 340/174.1 |
| 4,799,112 A | 1/1989 | Bremmer et al. ............. 360/31 |
| 4,821,125 A | 4/1989 | Christensen et al. .......... 360/31 |
| 4,907,109 A | 3/1990 | Senio ....................... 360/78.04 |
| 4,965,501 A | 10/1990 | Hashimoto ................... 318/595 |
| 5,047,876 A | 9/1991 | Genheimer et al. ............ 360/46 |
| 5,084,791 A | 1/1992 | Thanos et al. ............... 360/77.04 |
| 5,128,813 A | 7/1992 | Lee .......................... 360/78.07 |
| 5,262,907 A | 11/1993 | Duffy et al. ................ 360/77.05 |
| 5,276,662 A | 1/1994 | Shaver, Jr. et al. ............ 369/32 |
| 5,408,365 A | 4/1995 | Van Doorn et al. ............ 360/46 |
| 5,408,367 A | 4/1995 | Emo .......................... 360/53 |
| 5,422,760 A | 6/1995 | Abbott et al. ................. 360/46 |
| 5,455,717 A | 10/1995 | Van Doorn et al. ............. 360/6 |
| 5,550,502 A | 8/1996 | Aranovsky ................... 327/423 |
| 5,592,340 A | 1/1997 | Minuhin et al. ............... 360/46 |
| 5,631,999 A | 5/1997 | Dinsmore .................... 388/805 |
| 5,726,818 A | 3/1998 | Reed et al. ................... 360/51 |
| 5,732,055 A | 3/1998 | Masaki et al. ................ 369/54 |
| 6,088,662 A * | 7/2000 | Flinsbaugh et al. ......... 702/132 |
| 6,124,998 A | 9/2000 | Kanegae ...................... 360/68 |
| 6,266,203 B1 * | 7/2001 | Street et al. .................. 360/69 |

* cited by examiner

Primary Examiner—David Hudspeth
Assistant Examiner—Mitchell Slavitt
(74) Attorney, Agent, or Firm—Westman, Champlin & Kelly

(57) ABSTRACT

An apparatus and associated method used to control a disc drive having at least one disc and a transducer positionable relative to the disc by a motor. The motor receives energization through at least one power switch integrated on a semiconductor circuit. Temperature of the circuit is sensed proximate the power switch. A temperature signal is provided which is indicative of whether the sensed temperature meets one of a plurality of different threshold temperatures. The power switch is controlled in one of a plurality of different control modes based upon the temperature signal.

20 Claims, 4 Drawing Sheets

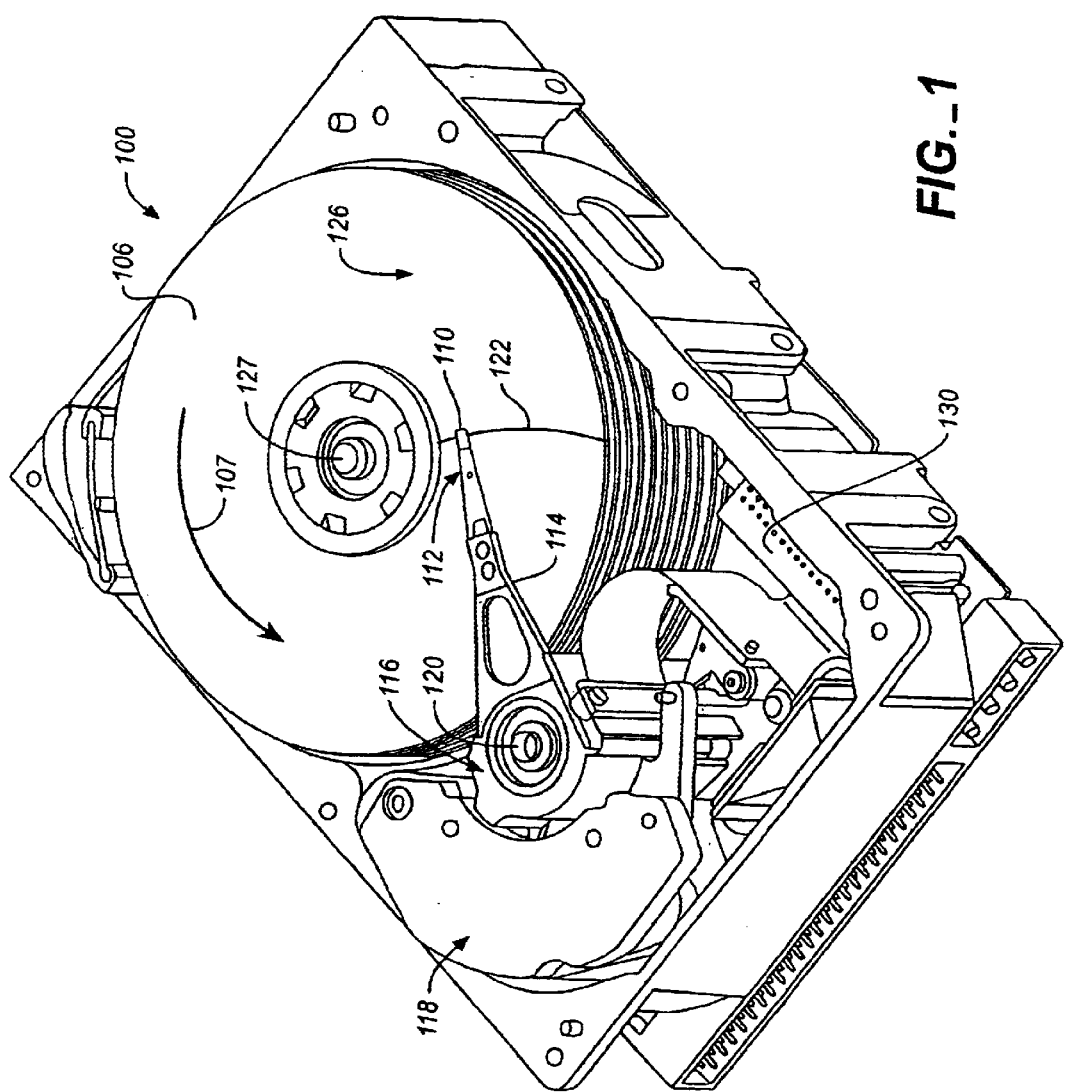
FIG._1

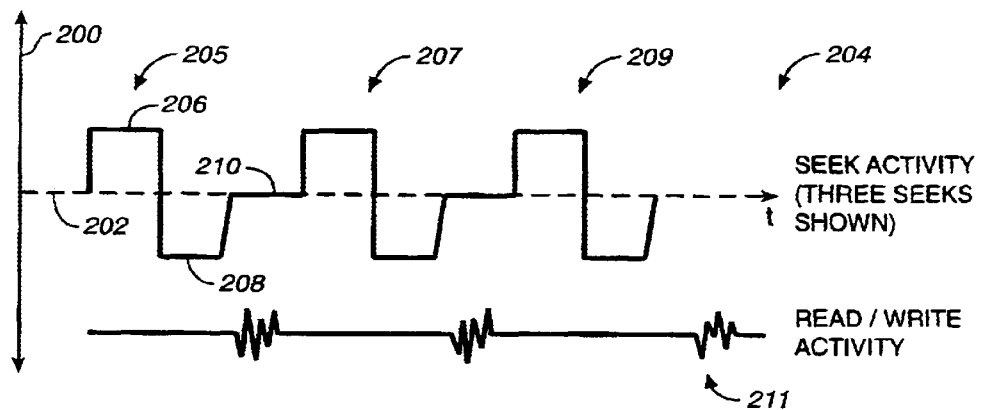
FIG._2
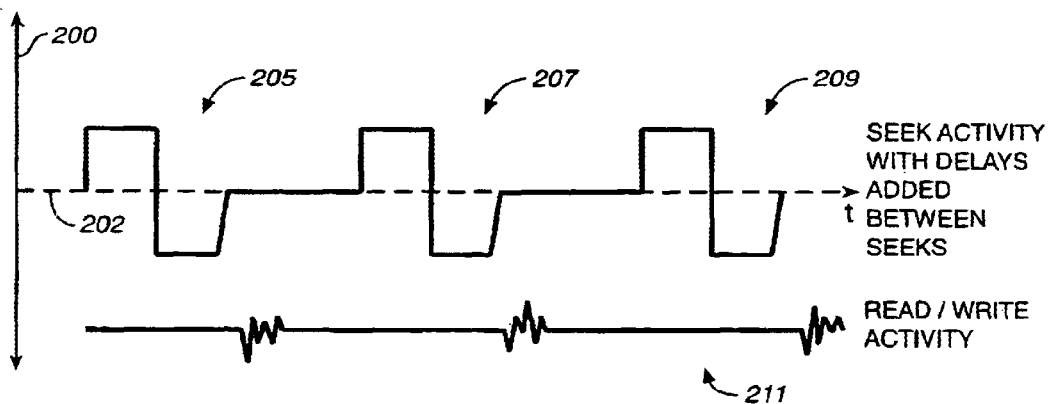
FIG._5

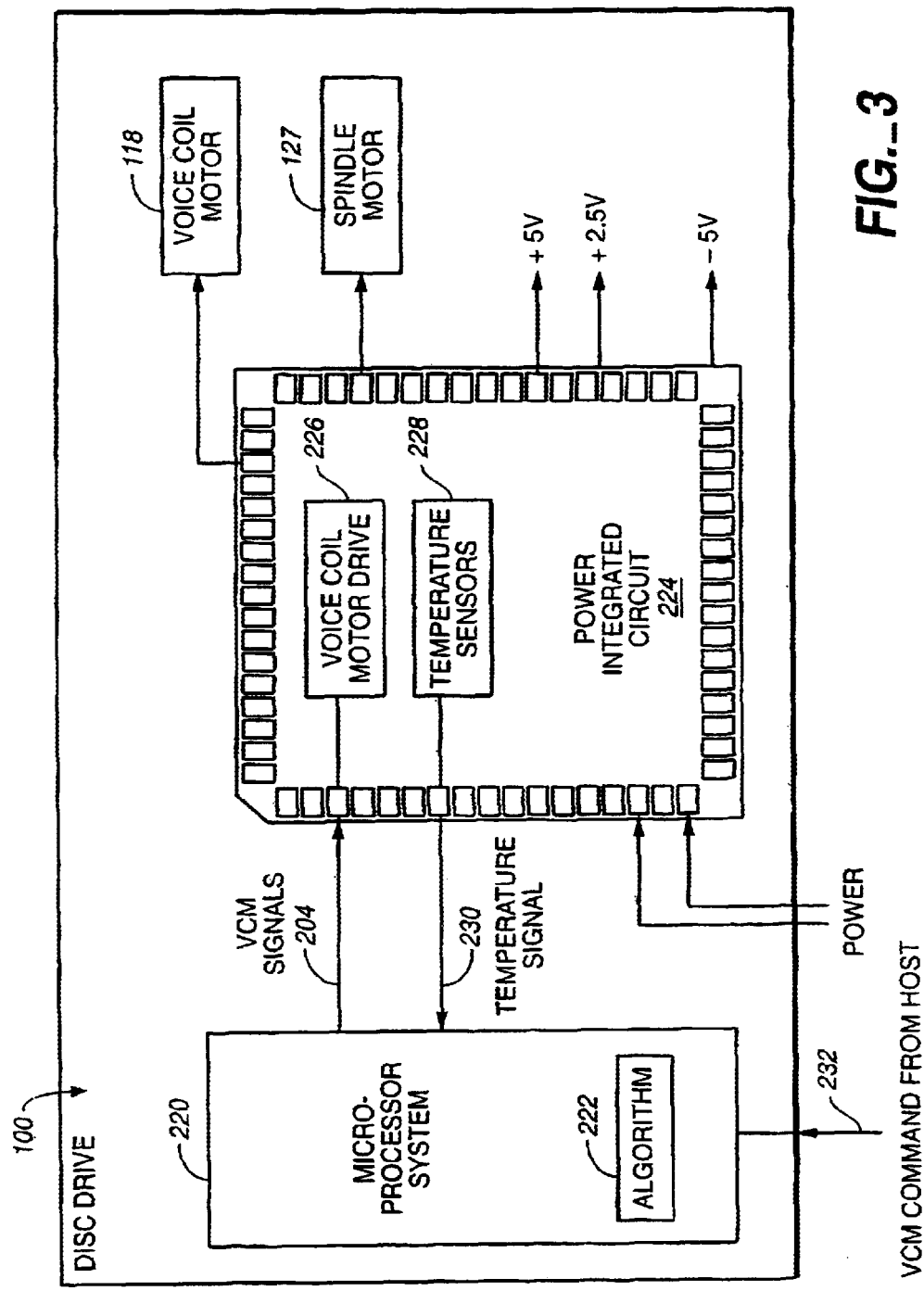
FIG._3

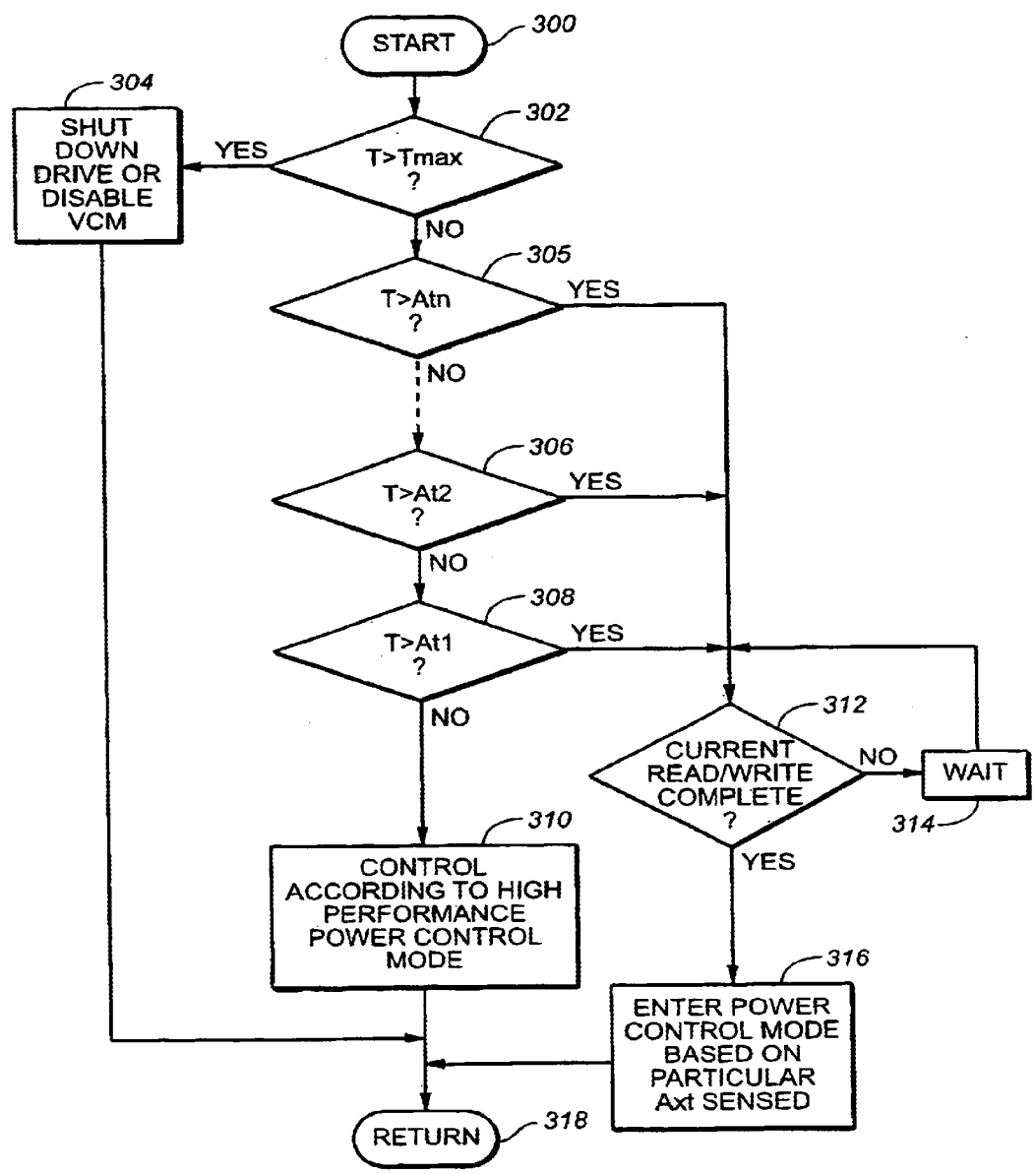
FIG._4

THERMAL PERFORMANCE OF AN INTEGRATED AMPLIFIER IN A DISC DRIVE

CROSS-REFERENCE TO CO-PENDING APPLICATION

The present application claims priority from Provisional Application Serial No. 60/271,302, filed on Feb. 23, 2001, entitled METHOD OF LIMITING TEMPERATURE RISE IN A DISC DRIVE INTEGRATED AMPLIFIER; and Provisional Application Serial No. 60/269,144, filed on Feb. 15, 2001, entitled OPTIMIZING THERMAL PERFORMANCE OF AN INTEGRATED CIRCUIT IN A DISC DRIVE; reference is also made to related co-pending U.S. patent application Ser. No. 09/293,379 entitled OPTIMIZING THERMAL PERFORMANCE OF AN INTEGRATED CIRCUIT IN A DISC DRIVE filed on Jun. 27, 2001.

FIELD OF THE INVENTION

The present invention deals with disc drives. More specifically, the present invention deals with limiting undesirable shut down of a disc drive due to undesirable increases in integrated circuit temperature.

BACKGROUND OF THE INVENTION

A typical disc drive includes one or more discs mounted for rotation on a hub or spindle. A typical disc drive also includes one or more transducers supported relative to surfaces of the discs in the disc drive to read information from, and write information to, the discs. The transducers along with any air bearings associated therewith are collectively referred to as a data head. A drive controller is conventionally used for controlling the disc drive system based on commands received from a host system. The drive controller controls the disc drive to retrieve information from the disc and to store information on the disc.

An actuator operates within a servo system and typically includes an actuator arm that supports a flexure or flexure assembly which, in turn, supports the data head. The actuator moves the data head radially over the disc surface for track seek operations and holds the transducer directly over a track on the disc surface for track following operations.

Information is typically stored on the discs by providing a write signal to the data head to encode information on the surface of the disc representing the data to be stored. In retrieving data from the disc, the drive controller controls the actuator so that the data head flies above the disc, sensing the information on the disc, and generating a read signal based on that information. The read signal is then decoded by the drive controller to recover the data represented by the information stored on the disc, and consequently represented in the read signal provided by the data head.

In some current disc drives, the servo system includes a voice coil motor (VCM) for moving the transducer or data head relative to the tracks on the disc. The disc drive also includes a spindle motor for driving rotation of the rotatable discs in the disc drive. Historically, power has been provided to these two motors using discrete power transistors. However, these power transistors can be integrated into the integrated circuit which switches the power transistors to energize, and deenergize, the voice coil motor and spindle motor.

When all of the power transistors (which in the past have included up to ten individual transistors) are concentrated inside one integrated circuit, the power density of this integrated solution is higher than that found under former solutions with discrete amplifiers. This is because the total power which was previously distributed across ten or more devices is now concentrated into one physical component. Therefore, the junction temperature of the integrated circuit can become problematic, particularly in high performance products. For example, all semiconductors have a maximum reliable operating temperature. Operating the device at or above the reliable operating temperature limit can, and likely will, result in several undesirable behaviors, such as degraded performance, increased power losses, and premature failure.

Prior attempts to deal with the high power density of a totally integrated amplifier used temperature sensors to indicate when the device maximum junction temperature had been reached. This generated a high temperature trigger event. Upon the high temperature trigger event, the disc drive controller would either disable the actuator voice coil amplifier or even turn off the disc drive. In either case, the disc drive was no longer available to save or recall data.

Embodiments of the present invention address one or more of these and other problems, and offers advantages over the prior art.

SUMMARY OF THE INVENTION

Embodiments of the present invention are used to control a disc drive having at least one disc and a transducer positionable relative to the disc by a motor. The motor receives energization through at least one power switch integrated on a semiconductor circuit. Temperature of the circuit is sensed proximate the power switch. A threshold temperature signal is provided which is indicative of whether the sensed temperature meets one of a plurality of different threshold temperatures. The power switch is controlled in one of a plurality of different control modes based upon the threshold temperature signal.

BRIEF DESCRIPTION OF THE DRAWINGS

FIG. 1 illustrates a disc drive in accordance with one embodiment of the present invention.

FIG. 2 illustrates a conventional seek profile in accordance with prior art seeking techniques along with corresponding read/write activity.

FIG. 3 is a more detailed block diagram of a portion of the disc drive shown in FIG. 1.

FIG. 4 is a flow diagram illustrating controlling of the power switches in a disc drive in accordance with one embodiment of the present invention.

FIG. 5 is similar to FIG. 2 but illustrates that delays are inserted between seeks in accordance with one embodiment of the present invention.

DETAILED DESCRIPTION OF ILLUSTRATIVE EMBODIMENTS

FIG. 1 illustrates an embodiment of a disc drive storage device 100. Disc drive 100 includes a disc pack 126 having storage surfaces 106 that are illustratively layers of material (such as magnetic material or optically readable material). The disc pack 126 includes a stack of multiple discs each accessible by a read/write assembly 112 which includes a transducer or head 110. A spindle motor 127 drives rotation of the discs in disc pack 126 in a direction such as that shown by arrow 107. As discs are rotated, read/write assembly 112 accesses different rotational locations on the storage surfaces 106 in disc pack 126. Read/write assembly 112 is actuated for radial movement relative to the disc surfaces 106, such as in a direction indicated by arrow 122, in order to access different tracks (or radial positions) on the disc surfaces 106. Such actuation of read/write assembly 112 is illustratively provided by a servo system which includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100. In doing so, control circuitry 130 illustratively includes power switches (such as power transistors) that provide energization to spindle motor 127 and voice coil motor 118.

In controlling disc drive 100, control circuitry 130 illustratively energizes spindle motor 127 so that the disc pack 126 rotates and can thus be accessed by read/write assembly 112. Control circuitry 130 also controls voice coil motor 118 to perform either track following or track seek operations. In a track following operation, the voice coil motor 118 controls the radial position of read/write assembly 112 to maintain assembly 112 over a designated track on the disc surface 106. In order to perform a seek operation, control circuitry 130 illustratively controls voice coil motor 118 so that it moves radially in the direction indicated by arrow 122 to a desired track or cylinder on the disc surfaces. In order to do this, control circuit 130 illustratively controls voice coil motor 118 according to a seek profile.

FIG. 2 illustrates one embodiment of conventional seek activity 204 showing three seek operations 205, 207 and 209. FIG. 2 also shows where the corresponding read/write activity 211 takes place relative to the seek operation. FIG. 2 graphs voice coil energization 200 (such as voltage or current) against time 202. It can be seen that, during a first portion 206 of seek profile 204 shown in FIG. 2, control circuitry 130 controls the power transistors to provide an acceleration energization to voice coil motor 118 such that read/write assembly 112 accelerates in the direction of the target track as indicated by the seek operation. As read/write assembly 112 approaches the target track, control circuitry 130 controls the power transducers to provide a deceleration energization (indicated by portion 208 of seek profile 204) to voice coil motor 118 such that read/write assembly 112 decelerates as it approaches the target track. After deceleration, the servo system locks on the target track at portion 210 and the read/write activity is performed. It can be seen that the seek profile portions 206 and 208 require control circuitry 130 to control the power switches to provide energization to voice coil motor 118.

FIG. 3 is a more detailed block diagram of a portion of disc drive 100 in accordance with one embodiment of the present invention. Similar items are similarly numbered to those shown in FIG. 1.

FIG. 3 shows that disc drive 100 includes a microprocessor system 220 which stores a power switch control algorithm 222. Microprocessor system 220 provides signals to power integrated circuit 224 which includes the voice coil motor drive circuit 226 and a plurality of temperature sensors 228. Voice coil motor drive circuit 226 illustratively includes integrated power transistors which are integrated on power integrated circuit 224, as well as switching circuitry for controlling switching of the power transistors. Voice coil motor drive circuit 226 provides signals to voice coil motor 118 to selectively energize voice coil motor 118 for proper positioning of read/write assembly 112 relative to disc pack 126.

In an illustrative embodiment, power integrated circuit 224 also includes a spindle motor drive circuit (not shown) which includes power transistors for selectively providing energization to spindle motor 127 in order to cause selective rotation of spindle motor 127 during operation of disc drive 100.

FIG. 3 also shows that, in one illustrative embodiment, power integrated circuit 224 includes the plurality of temperature sensors 228 which are configured closely proximate the power transistors in circuit 226 to sense temperature of power integrated circuit 224 in that area. Each of temperature sensors 228 is illustratively configured to sense a different temperature and provide a temperature signal 230 back to microprocessor system 220 indicative of whether the sensed temperature has reached the temperature associated with that particular temperature sensor 228. Temperature sensors 228 can be any temperature sensors suitable to this task.

In operation, microprocessor system 220 receives a VCM command 232 from a host system (not shown). The VCM command 232 provides an indication to microprocessor system 220 of specific data which the host system desires. Microprocessor system 220, in response, provides VCM signals 234 to voice coil motor drive circuit 226. Based on these signals, voice coil motor drive circuit 226 controls the power amplifiers to provide a desired energization (such as voltage or current) to voice coil motor 118. This causes voice coil motor 118 to perform the desired seek (or track follow) operation such that read/write assembly 112 can access the data desired by the host system.

In accordance with one embodiment of the present invention, temperature sensors 228 can include at least one temperature sensor which has a temperature trip point $T_{max}$ and one or more temperature sensors which have anticipatory trip points ($A_x$). The temperature sensor which has the $T_{max}$ trip point is illustratively configured to provide a signal 230 to microprocessor system 220 indicating that the maximum safe operating temperature of integrated circuit 224 has been sensed in the region proximate the power transistors in circuit 226. The temperature sensors associated with the anticipatory set points $A_x$ are illustratively configured to provide signals 230 to microprocessor system 220 indicating that those anticipatory temperatures (below $T_{max}$) have been sensed on power integrated circuit 224 in the area proximate the power transistors in circuit 226. Such signals 230 can illustratively operate as dedicated interrupts to the microprocessor in microprocessor system 220, or they can be stored in buffer registers which are intermittently polled by microprocessor system 220. Of course, signals 230 can be provided in any other desired fashion to microprocessor system 220 as well, so long as microprocessor system 220 can detect that the temperature set points have been sensed in sufficient time to implement the alternative control algorithms discussed herein.

An embodiment of the present invention will proceed with an illustrative description in which three or more anticipatory set points are sensed by temperature sensors 228, as well as $T_{max}$. Of course, the present invention can be implemented with any number of anticipatory set points.

FIG. 4 is a flow diagram which illustrates operation of the drive in accordance with an embodiment of the present invention in greater detail. As the drive is operating, temperature sensors 228 are illustratively continuously sensing the temperature of power integrated circuit 224 to determine whether it has reached the temperature set points associated with the temperature sensors 228. Algorithm 222 is also illustratively checking to determine whether the temperature sensors 228 are providing signals 230 indicative of the fact that those temperatures have been sensed.

Therefore, in one illustrative embodiment, algorithm 222 first determines whether signals 230 are indicating that temperature sensors have sensed $T_{max}$. This is indicated by blocks 300 and 302. If so, this indicates that the maximum safe operating temperature of power integrated circuit 224 has been reached and the drive 100 is risking damage and/or failure if further operation is performed. Therefore, microprocessor system 220 either turns off the power transistors in voice coil motor 118, or powers down the drive in a desired mode. This is indicated by block 304. Alternatively, it can first be determined whether the drive can complete the current data transfer before shutting down the drive.

However, if, at block 302, it is determined that $T_{max}$ has not been sensed, then algorithm 222 determines whether any of anticipatory set points have been reached. In one illustrative embodiment, algorithm 222 starts with the highest set point (closest to $T_{max}$). This is illustrated in FIG. 4 by anticipatory temperature $A_{TN}$. If $A_{TN}$ has not been reached, algorithm 222 continues looking at signals 230 to determine whether any of the lower anticipatory temperatures have been reached. These steps are indicated by blocks 305, 306 and 308 in FIG. 4. If signals 230 indicate that none of the anticipatory set points $A_{TX}$ have been reached, then algorithm 222 simply allows microprocessor 220 to control voice coil motor 118 according to the high performance power control mode implementing a seek profile, such as that shown in FIG. 2. This is indicated by block 310.

However, if any of the anticipatory temperatures have been sensed, then algorithm 222 determines whether the current read or write operation is complete. This is indicated by block 312. The reason for this determination is that it is desirable that algorithm 222 will not interrupt a current read or write operation or data may be lost. Therefore, algorithm 222 illustratively causes microprocessor system 220 to simply wait until the current read or write operation has been completed as indicated by block 314.

Once the current read or write operation has been completed, then algorithm 222 causes microprocessor system 220 to enter a power control mode based on the particular anticipatory temperature $A_{TX}$ that was sensed. This is indicated by block 316. In other words, microprocessor system 220 can control voice coil motor 118 according to a variety of different seek profiles, all of which reduce the energization provided to voice coil motor 118, but all of which cause some degradation in performance of the drive during seek operations in comparison to the high performance power control mode. For example, when $A_{TN}$ is sensed, seeking is illustratively prevented and other circuitry can be set to lower power idle mode to reduce overall power dissipation.

Generally, as microprocessor system 220 operates in one of a plurality of different power control modes, the power dissipated by the servo system (the power transistors in circuit 226 and voice coil motor 118) is proportional to the performance degradation of the drive 100.

Such power control modes are illustrated by FIG. 5. In particular, as lower anticipatory temperatures are sensed, wait states are inserted between seek operations 205, 207 and 209. In one embodiment, the higher the anticipatory temperature sensed, the more wait states are inserted. This slows down the drive but reduces power dissipation. FIG. 5 shows that wait states have been inserted which lengthens the time between periods when the read/write activity can be performed. As the temperature increases, this time also increases but it further limits power dissipation.

The present invention can be implemented as a method of controlling a disc drive 100 having at least one disc and a transducer 110 positionable relative to the disc by a motor 118. The motor 118 receives energization through at least one power switch 226 which is integrated on a semiconductor circuit 224. The method includes sensing temperature of the circuit 224 proximate the power switch 226. A temperature signal 230 is indicative of whether the sensed temperature meets one of a plurality of different threshold temperatures $A_{XN}$, $T_{max}$. The power switch 226 is controlled in one of a plurality of different control modes (FIG. 5) based on the temperature signal 230.

In one embodiment, a controller 220 controls the power switch 226 and the temperature signal 230 is provided as an interrupt to controller 220. The controller 220 can also control the power switch 226 by having the data indicative of the temperature signal 230 be written to a memory location polled by controller 220.

In one illustrative embodiment, a plurality of different temperature sensors 228 are provided and each is configured to provide a temperature signal 230 indicative of the sensed temperature meeting one of the plurality of different threshold temperatures $A_{XN}$, $T_{max}$.

In another embodiment, semiconductor integrated circuit 224 has a reliable operating temperature $T_{max}$ and one of the temperature sensors 228 provides the threshold temperature signal 230 indicative of the sensed temperature meeting a first temperature that is below the reliable operating temperature $T_{max}$. In another embodiment, the temperature signal 230 is provided and is indicative of the sensed temperature meeting one of a plurality of threshold temperatures, each of which is below the reliable operating temperature threshold $T_{max}$. In another embodiment, temperature sensor 228 is configured to provide the temperature signal 230 indicative of the temperature meeting the reliable operating temperature threshold $T_{max}$.

In another embodiment, the semiconductor circuit 224 has a maximum desired operating temperature and controller 220 controls the power switch 226 to reduce power dissipated by the motor 118 according to a control mode selected based on the one of the plurality of temperatures indicated by the temperature signal 230. The plurality of temperatures can include at least two anticipated threshold temperatures $A_{X1}$, $A_{X2}$ below the maximum desired maximum operating temperature $T_{max}$. The controller 220 controls the power switch 226 to reduce power dissipated by the motor 118 by a first reduction amount (such as one of FIG. 5) when the temperature signal 230 indicates that the sensed temperature has reached a first of the anticipated threshold temperatures. The controller 220 can also control the power switch 226 to reduce power dissipated by the motor 118 by a second reduction amount (another of FIG. 5) different than the first reduction amount, when the temperature signal 230 indicates that the sensed temperature has reached another of the anticipated threshold temperatures.

The motor 118 illustratively positions the transducer 110 relative to the disc surface 106 by performing a seek operation and wherein controller 220, increases an amount of time between seek operations 205, 207 and 209. Controller 220 can inhibit seek operations until the temperature is reduced by a desired amount.

Embodiments of the present invention can also be implemented as a method of controlling a servo system in a disc drive 100 having a disc and a transducer 110. The servo system includes a motor 118 energized by a power switch 226 integrated on a semiconductor switch control circuit 224. The motor 118 positions the transducer 110 relative to the disc according to a seek profile. A switch temperature of the semiconductor switch control circuit 224 proximate the power switch 226 is sensed. As the switch temperature increases to meet each of a plurality of different temperature thresholds, the seek profile is changed to a selected one of a plurality of different seek profiles to reduce power dissipated by the servo system. The position of the transducer 110 relative to the disc is controlled relative to the selected seek profile.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the drive while maintaining substantially the same functionality without departing from the scope and spirit of the present invention. In addition, although the preferred embodiment described herein is directed to a magnetic drive for a computer system, it will be appreciated by those skilled in the art that the teachings of the present invention can be applied to other systems, like optical or other systems, without departing from the scope and spirit of the present invention.

What is claimed is:

1. A method of controlling a data storage device having at least one storage surface and a transducer positionable relative to the storage surface by a motor, the motor receiving energization through at least one power switch integrated on a semiconductor circuit, the method comprising:
   (a) sensing temperature of the circuit proximate the power switch;
   (b) providing a temperature signal indicative of whether the circuit temperature meets one of a plurality of different threshold temperatures; and
   (c) controlling the power switch in one of a plurality of different control modes based on the temperature signal.

2. The method of claim 1 wherein the controlling step (c) is performed by a controller and wherein providing step (b) comprises:
   providing the temperature signal as an interrupt to the controller.

3. The method of claim 1 wherein the controlling step (c) is performed by a controller and wherein the providing step (b) comprises:
   writing data indicative of the temperature signal to a memory location polled by the controller.

4. The method of claim 1 wherein the sensing step (a) comprises:
   providing a plurality of temperature sensors, each being configured to provide a temperature signal indicative of the sensed temperature meeting one of the plurality of different threshold temperatures.

5. The method of claim 1 wherein the semiconductor circuit has a reliable operating temperature threshold and wherein the providing step (b) comprises:
   providing the temperature signal indicative of the sensed temperature meeting a first threshold temperature that is below the reliable operating temperature threshold.

6. The method of claim 1 wherein the semiconductor circuit has a reliable operating temperature threshold and wherein the providing step (b) comprises:
   providing the temperature signal indicative of the sensed temperature meeting one of a plurality of threshold temperatures, each of which is below the reliable operating temperature threshold.

7. The method of claim 6 wherein the providing step (b) further comprises:
   providing the temperature signal indicative of the sensed temperature meeting the reliable operating temperature threshold.

8. The method of claim 1 wherein the semiconductor circuit has a maximum desired operating temperature and wherein the controlling step (c) comprises:
   controlling the power switch to reduce power dissipated by the motor according to a control mode selected based on one of the plurality of threshold temperatures indicated by the temperature signal.

9. The method of claim 8 wherein the plurality of threshold temperatures include at least two anticipated threshold temperatures below the maximum desired operating temperatures, and wherein the controlling step (c) comprises:
   controlling the power switch to reduce power dissipated by the motor by a first reduction amount when the temperature signal indicates that the sensed temperature has reached a first of the anticipated threshold temperatures.

10. The method of claim 9 wherein the controlling step (c) comprises:
    controlling the power switch to reduce power dissipated by the motor by a second reduction amount, different than the first reduction amount, when the temperature signal indicates that the sensed temperature has met a second of the anticipated threshold temperatures, wherein the second anticipated threshold temperature is different than the first anticipated threshold temperature.

11. The method of claim 10 wherein the motor positions the transducer relative to the storage surface by performing seek operations and wherein the controlling step (c) further comprises:
    for a given seek operation, increasing a wait time period between seek operations.

12. The method of claim 11 wherein the controlling step (c) further comprises:
    inhibiting seek operations.

13. A data storage device comprising a transducer and a storage surface operably controlled in a data reading and writing relationship by a servo system, the servo system including a motor energized by a power switch, which is integrated on a semiconductor switch control circuit, the motor positioning the transducer relative the the storage surface according to a seek profile, the controller controlling the servo system by a method comprising:
    (a) sensing a switch temperature of the semiconductor switch control circuit proximate the power switch;
    (b) as the switch temperature increases to meet each of a plurality of different temperature thresholds, changing the seek profile to a selected one of a plurality of different seek profiles to reduce power dissipated by the servo system; and
    (c) controlling positioning of the transducer relative to the storage surface according to the selected seek profile.

14. The data storage device of claim 13 wherein the changing step (b) comprises:
    changing the seek profile to increase an amount of time between seek operations.

15. The data storage device of claim 14 wherein the changing step (b) further comprises:

as the sensed switch temperature increases, increasing the amount of time between seek operations.

16. The data storage device of claim 15 wherein the changing step (b) further comprises:

when a predetermined temperature is reached, inhibiting seek operations without powering down the data storage device.

17. The dice drive data storage device of claim 16 wherein the inhibiting step in (b) comprises:

prior to powering down the, completing a present data transfer operation.

18. A servo system in a data storage device, comprising:

a transducer;

means for positioning the transducer; and integrated power switch means for energizing the means for positioning and selectively reducing power dissipated by the servo system in response to a sensed temperature proximate the integrated power switch means.

19. The servo system of claim 18 wherein the integrated power switch means comprises:

means for changing a seek profile according to which the servo system is controlled to increase time between seek operations.

20. The servo system of claim 18 wherein the integrated power switch means comprises:

means for changing a seek profile according to which the servo system is controlled to inhibit seek operations.

\* \* \* \* \*

UNITED STATES PATENT AND TRADEMARK OFFICE
CERTIFICATE OF CORRECTION

PATENT NO. : 6,747,838 B2  Page 1 of 1
DATED : June 8, 2004
INVENTOR(S) : Korbel et al.

It is certified that error appears in the above-identified patent and that said Letters Patent is hereby corrected as shown below:

Column 1,
Line 14, change Ser. No. "09/293,379" to -- 09/893,379 --.

Column 9,
Line 10, delete "dice drive".
Line 12, after "powering down" delete "the," insert -- the data storage device, --.

Signed and Sealed this

Twenty-fifth Day of October, 2005

JON W. DUDAS
*Director of the United States Patent and Trademark Office*